No. 710,593. Patented Oct. 7, 1902.
G. E. MEDLEY.
CLUTCH.
(Application filed May 14, 1902.)
(No Model.) 2 Sheets—Sheet 1.
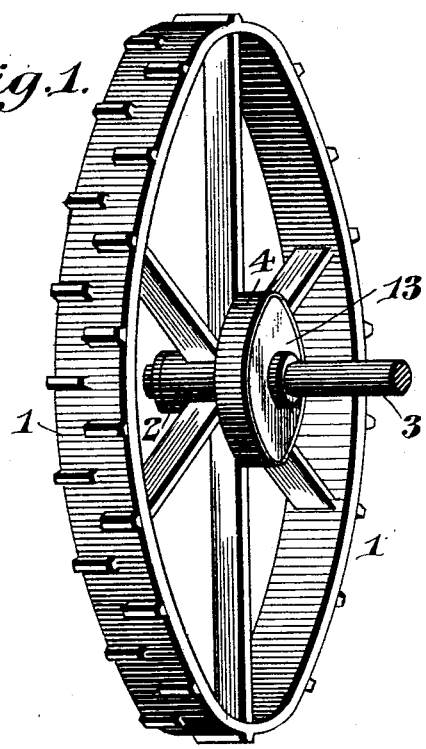
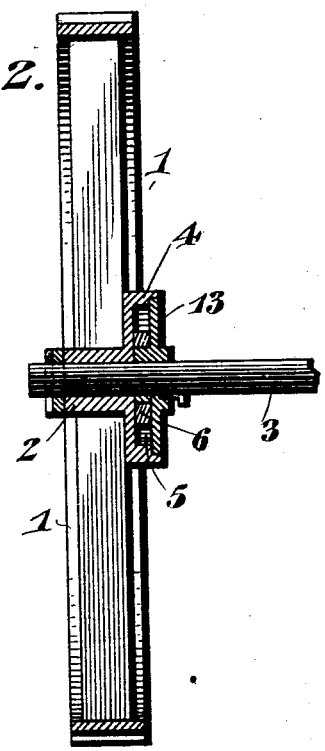
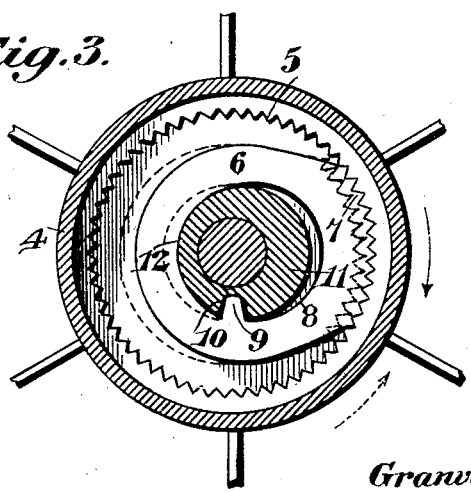
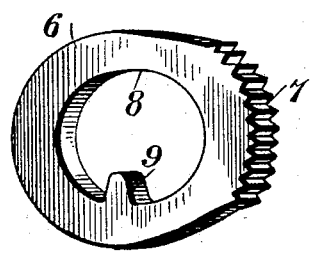
Granville E. Medley, Inventor
Witnesses
Jas. K. McCathran
Louis G. Julihn
By E. G. Siggers
Attorney No. 710,593. Patented Oct. 7, 1902.
G. E. MEDLEY.
CLUTCH.
(Application filed May 14, 1902.)
(No Model.) 2 Sheets—Sheet 2.

Witnesses
Jas. K. McCathran
Louis G. Julihn

Inventor
Granville E. Medley
By E. G. Siggers
Attorney

THE NORRIS PETERS CO., PHOTO-LITHO., WASHINGTON, D. C.

UNITED STATES PATENT OFFICE.

GRANVILLE EUSTACE MEDLEY, OF GRACEY, KENTUCKY, ASSIGNOR OF ONE-HALF TO GIPP WATKINS, OF GRACEY, KENTUCKY.

CLUTCH.

SPECIFICATION forming part of Letters Patent No. 710,593, dated October 7, 1902.

Application filed May 14, 1902. Serial No. 107,347. (No model.)

*To all whom it may concern:*

Be it known that I, GRANVILLE EUSTACE MEDLEY, a citizen of the United States, residing at Gracey, in the county of Christian and State of Kentucky, have invented a new and useful Clutch, of which the following is a specification.

This invention relates to a novel clutch applicable in any connection requiring the engagement of a rotary driving element with or its disengagement from a rotary driven element.

The object of the invention in its broader aspect is to produce a simple, durable, and reliable clutch for automatically clutching two rotary members for movement in unison in one direction and for automatically unclutching the members through the relative rotation of said members in the opposite direction.

Considered somewhat more specifically, the object of the invention is to provide a clutch peculiarly adapted for use in mowers, grain-drills and other agricultural implements, to provide an improved form of clutch connection between the axle and the carrying-wheels, it being understood that in agricultural implements generally the operating parts are geared to the axle, which when the machine is moved forward is rotated by the carrying-wheels through the medium of pawl-and-ratchet mechanism designed to permit the rearward rotation of wheels without effecting corresponding movement of the axle.

To the accomplishment of these objects my invention contemplates the employment of a clutch-ring having rocking connection with one rotary element—as, for instance, an axle—and having an engaging portion so related to another rotary element—as, for instance, a wheel—that when the wheel is rotated in one direction the clutch-ring will be moved thereby to clutch the two elements—as, for instance, the wheel and axle—and when said wheel is rotated in the opposite direction the ring will be moved to its disengaging position to permit independent movement of the parts.

Figure 5:
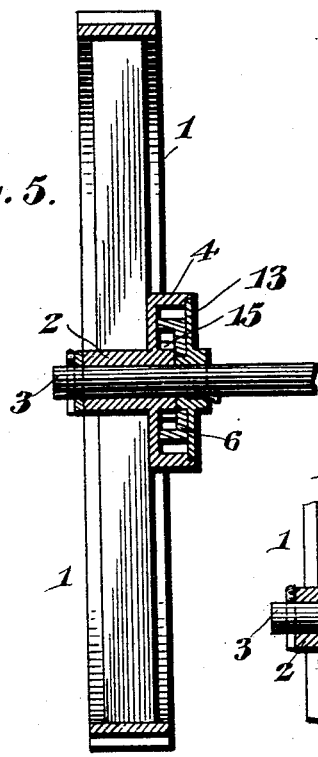
Figure 8:
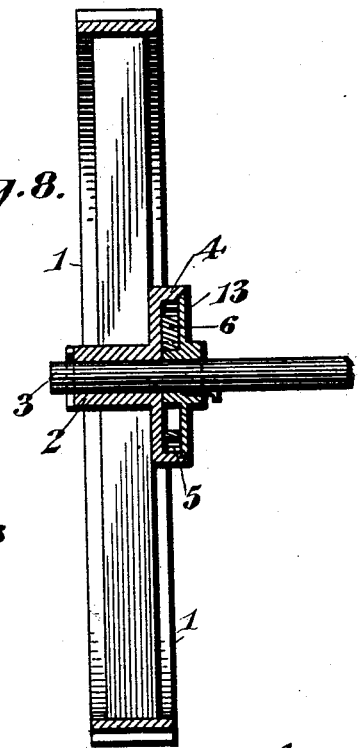
Figure 10:
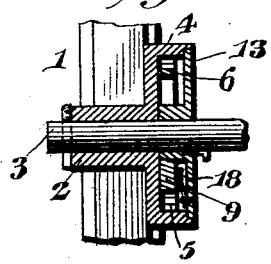
Figure 6:
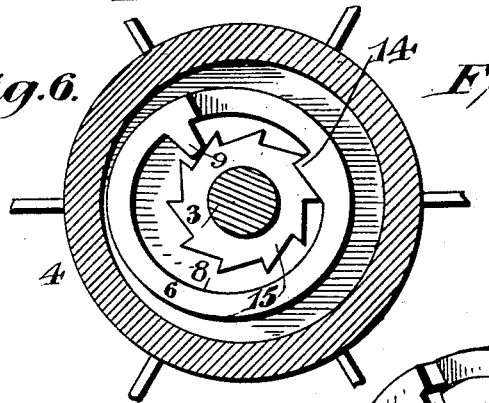
Figure 9:
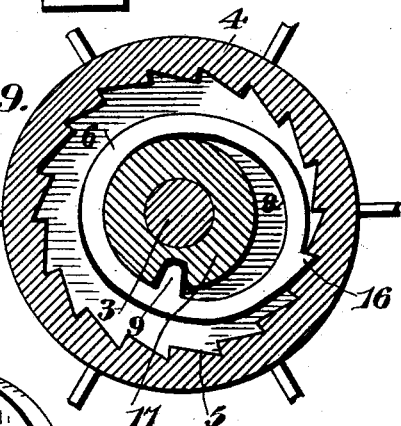
Figure 7:
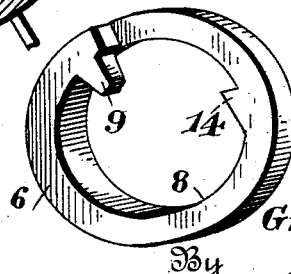

In the accompanying drawings, wherein I have illustrated several forms of the invention, Figure 1 is a perspective view of one of the carrying-wheels of a mower or other machine, showing the location of my improved clutch in the inner end of the wheel-hub. Fig. 2 is a sectional view through the subject-matter of Fig. 1. Fig. 3 is a sectional elevation of a wheel-hub and axle equipped with a clutch-ring, the disengaging position of which is indicated in dotted lines. Fig. 4 is a detail perspective view of the clutch-ring. Figs. 5 and 6 are views similar to Figs. 2 and 3, but illustrating another form of clutch. Fig. 7 is a detail perspective view of the clutch-ring shown in Figs. 5 and 6. Figs. 8 and 9 are views corresponding to Figs. 5 and 6, but showing a further variation of the construction; and Fig. 10 is a detail sectional view showing a spring bearing upon the clutch-ring to present frictional resistance to the undue movement thereof and to create sufficient friction between the clutch-ring and the wheel-hub to insure the engagement of the ring by the hub.

Referring more particularly to the first four figures of the drawings, 1 indicates a driving element or wheel provided, as usual, with a hub 2, mounted to rotate freely upon a driven element or axle 3, which, as already stated, is generally utilized for the driving of the operative parts of the machine when the latter is advanced.

In mowing-machines and other agricultural implements it has been usual to employ pawl-and-ratchet mechanism for connecting the carrying-wheels with the axle during the advance of the machine and for disconnecting the wheels from the axle when the machine is backed or for disconnecting one of the wheels when the axle is driven at a higher speed by the other wheel—as, for instance, in making a turn. The use of such mechanism is objectionable because it involves the mounting of the pawls upon pintles and the employment of auxiliary devices—as, for instance, springs or the like—for urging the pawls toward the ratchet-teeth, and the construction is therefore comparatively expensive, more or less liable to derangement, and uncertain in action. My invention therefore contemplates the employment of a single element located intermediate of the axle and wheel to effect the automatic clutching or unclutching of the parts and eliminating the necessity for the employment of pintles, springs, or other separate parts for the mounting or retention of the single clutch element.

The inner end of the hub 2 is formed with an enlargement 4, provided with internal teeth 5 and constituting a pocket or recess within which is mounted a clutch-ring 6, surrounding the axle 3. The ring 6 is or may be slightly irregular in form and has a series of external teeth 7, designed to engage the internal teeth of the wheel-hub in the manner to be described. The opening 8 in the clutch-ring 6 is not of true circular form, but is slightly elongated, with its major axis disposed to bisect the arc upon which the series of teeth 7 is formed. Within the opening 8 is extended from one side thereof an internal fulcrum-tooth 9, integral with the ring and designed for engagement with a notch or socket 10, formed in the periphery of an eccentric sleeve 11, mounted on the shaft and fixed thereto. The part 11 is termed an "eccentric" sleeve because it is of substantially annular form, but is cut away at one side, as indicated at 12, to dispose the axis of the axle 3 at a point eccentric to the axis of the sleeve. The elongation of the opening 8 in the ring and the eccentric mounting of the sleeve 11 are designed for the same purpose—to wit, to accommodate sufficient independent rocking movement of the ring with the tooth 9 as a fulcrum to effect the engagement of the teeth 7 with or their disengagement from the internal teeth of the wheel-hub. Obviously, however, the cutting away of the side of the sleeve 11 might be dispensed with and said sleeve arranged concentric with the axle by elongating the opening 8 sufficiently to accommodate the necessary movement of the ring. By reason, however, of the construction shown I am enabled to employ a ring of more nearly annular form, and this I consider desirable. Obviously the sleeve 11 might be formed integral with the axle instead of being separate therefrom and fixed thereto; but the construction shown is adopted in order to permit my clutch to be quickly applied to machines already in use, and the sleeve is therefore constructed so as to be readily slipped to its place on the axle and is provided at or adjacent to one end with a cover-disk 13, which closes the inner end of the hub and serves to obscure and protect the interior parts.

The operation of that form of clutch shown in the first four figures is as follows: The parts being in the positions shown in Fig. 3 the rotation of the driving element or wheel in the direction of the full-line arrow will by reason of the engagement of the internal teeth 5 of the hub with the external teeth 7 of the ring effect the rotation of the axle, inasmuch as the tooth 9 of the ring has interlocking engagement with the sleeve 11, which is fixed upon and constitutes, in effect, a part of the driven element or axle. It should be noted that during this engagement of the parts the left-hand end of the ring will bear upon the peripheral face of the sleeve 11 from the tooth 9 to a point nearly diametrically opposite thereto. This bearing of the parts is material, since it relieves the tooth of a greater portion of the strain, and thus greatly strengthens the connection. If now the wheel is rotated in a rearward direction, as indicated by the dotted arrow, or if the same relative movement is obtained by the forward rotation of the shaft at a higher rate of speed than the wheel, the clutch-ring will be rocked back to the position indicated in dotted lines in Fig. 3, with the tooth 9 acting as a fulcrum. This rocking of the clutch-ring will cause its external teeth to recede from the teeth 5 sufficiently to effect the unclutching of the parts. It should be noted, however, that when the ring is in its inactive or unclutched position its teeth are disposed in closely-adjacent relation to the teeth 5, so that when the wheel is rotated in a forward direction the ring, being in frictional contact with the hub, will be rocked back to its initial position to effect the reclutching of the parts.

In Figs. 5, 6, and 7 I have illustrated another form of clutch. In this instance the clutch-ring, instead of being provided with a series of external teeth in addition to its internal fulcrum-tooth, is provided with a single internal tooth 14, designed to engage the external ratchet-teeth 15, formed upon the hub proper, the clutch-ring being widened somewhat to dispose the internal tooth 14 in a different plane from the fulcrum-tooth.

In Figs. 8 and 9 the construction is similar to the first form described, except that the internal teeth 15 of the hub enlargement are of ratchet form and engage a single external tooth 16 of the clutch-ring, and in this form, furthermore, the sleeve 17, corresponding to the sleeve 11, (shown in Fig. 3,) is of true cylindrical form and is arranged concentric with the axle.

In Fig. 10 I have shown a spring 18 bearing against the fulcrum-tooth of the clutch-ring and serving to prevent undue movement of the latter when urged to its disengaged position. This spring also insures the prompt engagement of the parts whenever the wheel is rotated in a forward direction, as it presses the ring into frictional contact with the end of the hub and causes the latter to move the ring to a position in which its teeth may be engaged by the teeth of the hub. Ordinarily, however, the employment of the spring is unnecessary, as the cover-plate 13 will retain the clutch-ring in position and will create sufficient friction between the ring and hub to insure the movement of the ring into engagement with the teeth of the hub when the wheel is rotated in a forward direction.

The operation of the clutches shown in the last six figures will be readily understood from the foregoing.

It should be observed that all forms of the invention include driving and driven elements and a clutch-ring having interlocking rocking engagement with one element and having means for engaging the other element when moved to one of its two positions. It will also be noted that the idea of forming a clutch connection by means of a single ring having toothed engagement with one element and designed for connection with another element is common to all forms of the invention.

It is thought that from the foregoing the construction and operation of my improved clutch will be readily apparent; but while the illustrated embodiments of the invention are believed at this time to be preferable I wish to be distinctly understood as reserving to myself the right to effect such changes, modifications, and variations of the illustrated structures as may fall properly within the scope of the protection prayed.

What I claim is—

1. The combination with an inner rotary member, of a clutch-ring connected thereto for rotation therewith, and having slight independent movement, and an outer rotary member disposed when rotated in one direction to engage the clutch-ring and when rotated in the opposite direction to release said ring.

2. The combination with an axle, and a wheel-hub provided with teeth, of a clutch-ring encircling the axle and having a tooth disposed to engage the teeth of the hub, means for retaining one side of the clutch-ring in frictional engagement with the end of the hub, whereby the movement of the hub will serve to move the clutch-ring for the purpose of engaging and disengaging the coöperating teeth of the hub and ring, and means connecting the clutch-ring and axle to cause the motion of the hub in one direction to be transmitted through the clutch-ring to the axle, said connecting means being arranged to permit sufficient independent movement of the clutch-ring to effect its engagement with and its disengagement from the teeth of the hub.

3. The combination with rotary coaxial members, of a clutch-ring having a single fulcrum-tooth engaged by one member, said ring being shiftable to engage the other member.

4. The combination with coaxial rotary members, of a clutch-ring having a single internal fulcrum-tooth engaged by one member and also having independent movement to engage the other member, said last-named member and the clutch-ring having coöperating engaging teeth.

5. The combination with coaxial rotary members, of a clutch-ring having teeth, one of which is disposed internally and has loose engagement with one member to permit the ring to be shifted into engagement with the other member, said last-named member having a series of teeth for engagement with the clutch-ring.

6. The combination with coaxial rotary members, of a clutch-ring loosely encircling one member and having an internal fulcrum-tooth engaging said member, and an external tooth, the other of said members being provided with internal teeth disposed for engagement by the external tooth of the clutch-ring.

7. The combination with coaxial rotary members, of an interposed clutch-ring of irregular form having shiftable engagement with one member and designed to engage the other member when the latter is rotated in one direction.

8. The combination with coaxial rotary members, of a clutch-ring of irregular form encircling one member and having a single fulcrum-tooth engaging said member, said clutch-ring and the other member having coöperating engaging teeth.

9. The combination with coaxial rotary members, one of which is provided with a peripheral notch, of a clutch-ring having an elongated opening for the reception of the notched member, an internal tooth engaging the notch, and external engaging teeth, and the other member having teeth designed to be engaged by the external teeth of the clutch-ring.

10. The combination with coaxial rotary members, of a notched sleeve on one member, a clutch-ring encircling said sleeve and having an internal fulcrum-tooth engaging the notch, the other member and the clutch-ring being provided with opposed engaging teeth.

11. The combination with coaxial rotary members, one of which is provided with internal teeth, of an eccentric sleeve mounted on the other member and having a peripheral notch, and a clutch-ring of irregular form encircling the eccentric sleeve and having an internal fulcrum-tooth engaging the notch in the sleeve, and external teeth disposed to engage the internal teeth of the first-named member.

12. The combination with coaxial rotary members, of a clutch-ring having toothed engagement with one member and shiftable into engagement with the other member, to connect said members for rotation in one direction.

13. The combination with coaxial rotary members, of a clutch-ring having teeth arranged to engage both members, said ring being in constant engagement with one member and being shiftable to engage the other member.

In testimony that I claim the foregoing as my own I have hereto affixed my signature in the presence of two witnesses.

GRANVILLE EUSTACE MEDLEY.

Witnesses:
H. H. COX,
HERBERT AMORS.